United States Patent
Schultz et al.

(10) Patent No.: US 12,162,056 B2
(45) Date of Patent: Dec. 10, 2024

(54) METHOD AND SYSTEM FOR FORMING A STAMPED COMPONENT USING A STAMPING SIMULATION MODEL

(71) Applicant: Ford Global Technologies, LLC, Dearborn, MI (US)

(72) Inventors: Brodie Schultz, Royal Oak, MI (US); Elizabeth Bullard, Royal Oak, MI (US); Jason Ryska, Allen Park, MI (US); Ralph Conrad, South Lyon, MI (US); Evangelos Liasi, Royal Oak, MI (US); Scott Ellis, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 516 days.

(21) Appl. No.: 16/907,422

(22) Filed: Jun. 22, 2020

(65) Prior Publication Data

US 2021/0394247 A1 Dec. 23, 2021

(51) Int. Cl.
*B30B 15/26* (2006.01)
*B21D 22/02* (2006.01)
(Continued)

(52) U.S. Cl.
CPC .............. *B21D 22/02* (2013.01); *B30B 15/26* (2013.01); *G05B 19/182* (2013.01);
(Continued)

(58) Field of Classification Search
CPC ...... B21D 22/02; B30B 15/26; G05B 19/182; G05B 19/4086; G05B 19/40938;
(Continued)

(56) References Cited

U.S. PATENT DOCUMENTS 5,586,041 A 12/1996 Mangrulkar
8,020,418 B2 9/2011 Suzuki et al.
(Continued)

FOREIGN PATENT DOCUMENTS

EP 3608743 A1 * 2/2020 ............. B21D 22/02
JP 2009136880 6/2009
WO 2018232930 12/2018

OTHER PUBLICATIONS

Lim, Yongseob "Improved Part Quality in Stamping Using Multi-Input Multi-Output (MIMO) Process Control" 2009 American control conference, FrC12.4 p. 5570-5575, Taken from Web URL:<https://ieeexplore.ieee.org/stamp/stamp.jsp?tp=&arnumber=5159838&tag=1> (Year: 2009).*

(Continued)

*Primary Examiner* — Kenneth M Lo
*Assistant Examiner* — Jonathan Michael Skrzycki
(74) *Attorney, Agent, or Firm* — Burris Law, PLLC

(57) ABSTRACT

A method for forming a stamped component from a blank material with an industrial stamping machine during a stamping process includes measuring a plurality of parameters of the stamping process. The parameters are provided as variables of the stamping process. The method further includes analyzing, by a stamping process model, the plurality of parameters to adjust the stamping process for the blank material, defining, by the stamping process model, a control parameter of the industrial stamping machine for the blank material, and stamping the blank material with the industrial stamping machine based on the defined control parameter to form the stamped component.

20 Claims, 4 Drawing Sheets

(51) Int. Cl.
*G05B 19/18* (2006.01)
*G05B 19/408* (2006.01)
*G05B 19/4093* (2006.01)
*G05B 19/401* (2006.01)

(52) U.S. Cl.
CPC ... G05B 19/4086 (2013.01); G05B 19/40938 (2013.01); *G05B 19/401* (2013.01); *G05B 2219/32017* (2013.01); *G05B 2219/35499* (2013.01); *G05B 2219/45137* (2013.01)

(58) Field of Classification Search
CPC ........ G05B 19/401; G05B 2219/32017; G05B 2219/35499; G05B 2219/45137; G06F 30/17; G06F 30/23; G06F 2119/14
See application file for complete search history.

(56) References Cited

U.S. PATENT DOCUMENTS

| | | | |
|---|---|---|---|
| 9,073,112 | B2 | 7/2015 | Cole et al. |
| 2007/0193012 | A1* | 8/2007 | Bergman ............. G05B 19/401 29/407.04 |
| 2008/0308252 | A1* | 12/2008 | Kirkman ................. B22C 9/065 164/458 |
| 2009/0105855 | A1* | 4/2009 | Mehta .................... G05B 17/02 700/89 |
| 2012/0283861 | A1* | 11/2012 | Zwickl ................. G05B 19/404 700/97 |
| 2018/0299862 | A1* | 10/2018 | Zhao .................. G05B 23/0281 |

OTHER PUBLICATIONS

Rababaah, Aaron "Automatic Visual Inspection System for Stamped Sheet Metals (AVIS3M)" 2012, IEEE, p. 661-665, Taken from Web URL:<https://ieeexplore.ieee.org/stamp/stamp.jsp?tp=&arnumber=6272855> (Year: 2012).*

Chi-Yueh Wang & Walton M. Hancock (1997) Minimizing Splits in the Automotive Stamping Process by Logistic Regression, Quality Engineering, 9:4, 653-663, DOI: 10.1080/08982119708919087 (Year: 1997).*

* cited by examiner

METHOD AND SYSTEM FOR FORMING A STAMPED COMPONENT USING A STAMPING SIMULATION MODEL

FIELD

The present disclosure relates to a production process for manufacturing a stamped component and more particularly, a vehicular stamped component.

BACKGROUND

The statements in this section merely provide background information related to the present disclosure and may not constitute prior art.

Stamping processes typically rely heavily on upstream engineering and feasibility studies to design new products and manufacturing methods. For example, significant amount of time is dedicated to modeling and simulating critical design criteria for forming a component. The models generally assume various process variables as being constant, thus leading to theoretical simulations that may not accurately simulate a real production environment and the variability that occurs in real-time. In addition, there are other variables that are omitted or even overlooked in the model because the data is not available, but play a significant role in controlling the formation of the component.

Even with the engineering and feasibility studies, an extensive amount of time may be needed to launch and integrate the stamping process into a production line. Furthermore, flaws can still exist resulting in production downtime for die and equipment adjustment. These issues with producing a stamped component, among other issues with the stamping process, are addressed by the present disclosure

SUMMARY

This section provides a general summary of the disclosure and is not a comprehensive disclosure of its full scope or all of its features.

In one form, the present disclosure is directed toward a method for forming a stamped component from a blank material with an industrial stamping machine during a stamping process. The method includes measuring a plurality of parameters of the stamping process. The parameters are provided as variables of the stamping process. The method further includes analyzing, by a stamping process model, the plurality of parameters to adjust the stamping process for the blank material, defining, by the stamping process model, a control parameter of the industrial stamping machine for the blank material, and stamping the blank material with the industrial stamping machine based on the defined control parameter to form the stamped component.

In another form, the plurality of parameters includes one or more blank parameters, one or more material parameters, one or more process parameters, or a combination thereof. The one or more blank parameters is indicative of physical characteristics of the blank material. The one or more material parameters is indicative of material characteristics of the blank material. The one or more process parameters is indicative of an additive process prior to stamping of the blank material, identified variables of the industrial stamping machine, or a combination thereof.

In yet another form, the one or more blank parameters includes a blank width, a blank thickness, a blank length, or a combination thereof. The one or more material parameters includes mechanical properties such as yield stress, tensile stress, strain, a friction coefficient, a strain hardening exponent, or a combination thereof. The one or more process parameters includes amount of lubrication applied to the blank material, a friction coefficient of dies within the industrial stamping machine, a surface roughness of the dies, or a combination thereof.

In one form, the method further includes measuring a post stamping characteristic of the stamped component, and analyzing the plurality of parameters and the post stamping characteristic to modify the stamping process model.

In another form, the method further includes defining the stamping process model. Defining the stamping process model further includes providing a datastore having a plurality of historical parameters and a plurality of historical control parameters for the plurality of historical parameters, defining a mathematical association between the plurality of historical parameters and the historical control parameters, and generating the stamping process model based on the defined mathematical association.

In yet another form, the method further includes displaying a digital stamping process dashboard. The digital stamping process dashboard is a digital representation of the stamping process and provides at least one of the plurality of parameters as the plurality of parameters are being measured.

In one form, the digital stamping process dashboard further provides a multi-dimensional stamped model of the stamped component, a blank multi-dimensional model of the blank material, the control parameter for the industrial stamping machine, or a combination thereof.

In another form, the control parameter includes a cushion tonnage, die travel, speed, draw cushion, or a combination thereof.

In yet another form, the method further includes measuring a post stamping characteristic of the stamped component, classifying the stamped component as being defective when the post stamping characteristic is exceeds a tolerance provided for the post stamping characteristic, and classifying the stamped component as being complete when the post stamping characteristic is within the tolerance provided for the post stamping characteristic.

In one form, the present disclosure is directed toward a stamping system for stamping a blank material to provide a stamped component. The stamping system includes an industrial stamping machine operable to perform a stamping process on a blank material, a plurality of sensors disposed to measure a plurality of parameters prior to the stamping process by the industrial stamping machine, and a process control system configured to define a control parameter of the industrial stamping machine for the blank material based on the plurality of parameters and a stamping process model. The plurality of parameters are provided as variables of the stamping process. The industrial stamping machine performs the stamping process based on the defined control parameter.

In another form, the plurality of sensors includes a multi-dimensional digital camera configured to measure a post stamping characteristic of the stamped component. The process control system is configured to determine whether the stamped component has a defect based on the post stamping characteristic.

In yet another form, the stamping system further includes a datastore storing a plurality of historical parameters and a plurality of historical control parameters for the plurality of historical parameters. The process control system is configured to define a mathematical association between the plurality of historical parameters and the historical control parameters and generate the stamping process model based on the mathematical association.

In one form, the process control system includes a monitor device operable to display a digital stamping process dashboard, wherein the digital stamping process dashboard is a digital representation of the stamping process and provides at least one of the plurality of parameters as the plurality of parameters are being measured.

In another form, the digital stamping process dashboard further provides a multi-dimensional stamped model of the stamped component, a multi-dimensional blank model of the blank material, the control parameter for the industrial stamping machine, or a combination thereof.

In yet another form, the plurality of sensors includes a multi-dimensional digital camera, a dimension measurement device to detect dimensions of the blank material, a material strength measurement device to measures tensile and yield strength of the blank material, a lubrication application measurement device to measure amount of lubrication applied to the blank material, a die sensor, or a combination thereof.

In one form, the process control system includes a machine controller configured to control the industrial stamping machine based on the control parameters, and a stamping analytics system including a stamping model controller and a datastore. The datastore stores a plurality of historical parameters and a plurality of historical control parameters for the plurality of historical parameters. The stamping analytics system is configured to define a mathematical association between the plurality of historical parameters and the historical control parameters and generate the stamping process model based on the mathematical association.

In another form, the machine controller stores the stamping process model to determine the control parameters of the industrial stamping machine.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
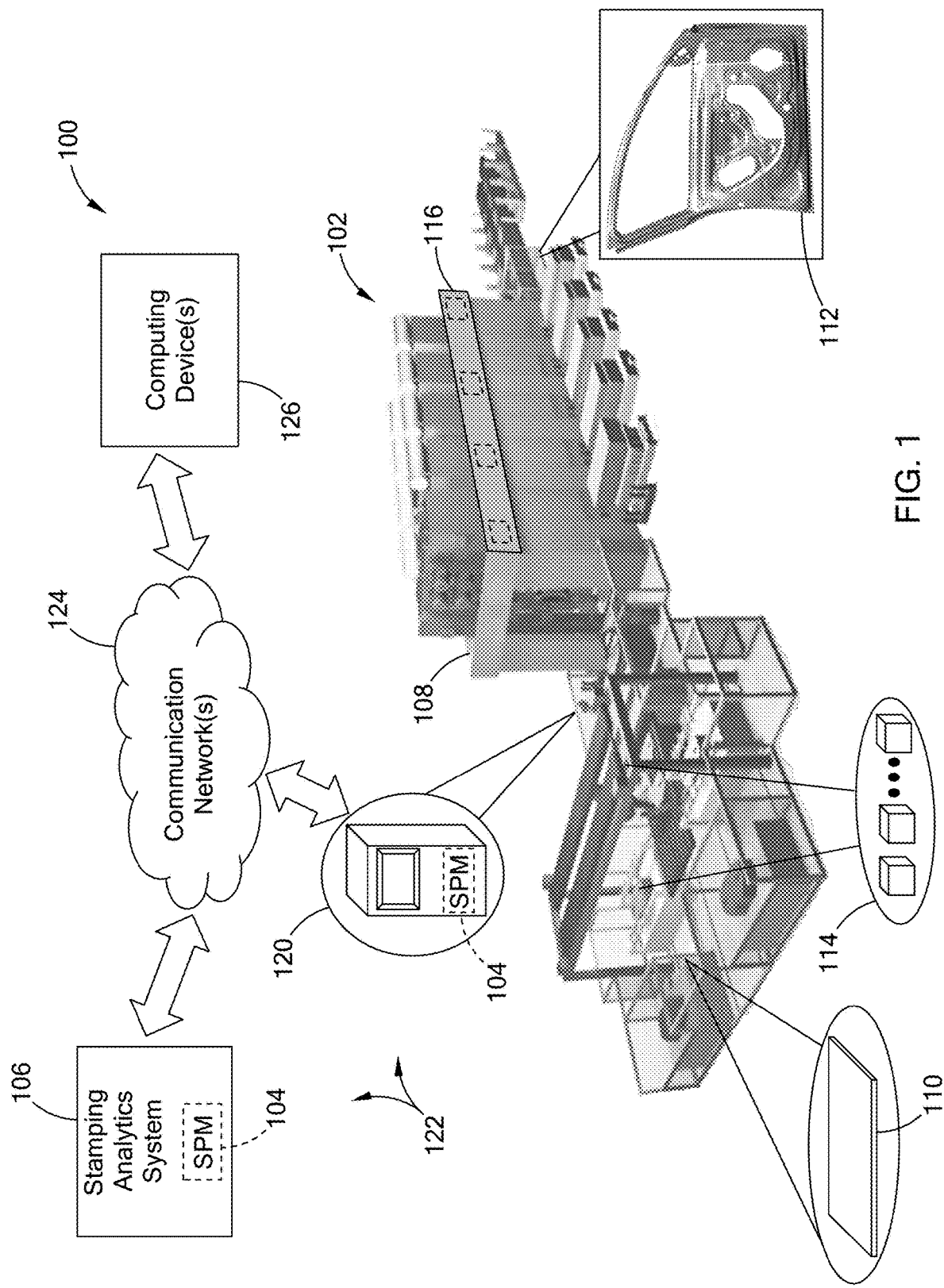
FIG. 1 illustrates a stamping system according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

To improve quality of stamped components and efficiency of the stamping process, the present disclosure is directed toward a real-time formability analysis that employs real-time measurements for defining control parameter(s) of stamping equipment (i.e., machine settings). Using data analytics, data is collected, correlated, and analyzed to define a stamping process model that performs real-time formability analysis of a blank material to be stamped. As data is collected and analyzed, the stamping process model learns the multivariable relationship between the stamping equipment and the blank material, thereby further improving the quality of stamped components and effectiveness of upstream modeling/simulation of new stamping lines.

Referring to FIG. 1, a stamping system 100 of the present disclosure is configured to monitor and analyze data captured at different stages of a stamping process 102. Specifically, the stamping system 100 incorporates machine learning methodologies to define a stamping process model (SPM) 104 based on identified parameters that influence the stamping process 102. In one form, the stamping system 100 includes the stamping process 102 and a stamping analytics system 106 for developing and improving the stamping process model 104

In one form, the stamping process 102 is provided in a manufacturing facility and includes an industrial stamping machine 108 that performs one or more stamping operations on a blank material 110 to form a stamped component 112. In one form, the industrial stamping machine 108 includes upper and lower dies and a blank holder for holding the blank material 110. During operation, with one or more strokes, the upper and lower dies draws the blank material 110 into the shape defined by the upper and lower dies. To perform the operation, various control parameter(s), such as, but not limited to, die load (tonnage), die travel, speed, and/or draw cushion are set.

To measure identified parameters for determining the control parameter, the stamping system 100 includes multiple preprocess sensors 114 along the stamping process 102. The parameters are provided as variables of the stamping process 102 that influence structural and material properties of the stamped component 112. In one form, the parameters include one or more blank parameters, one or more material parameters, and/or one or more process parameters. Blank parameters are indicative of physical characteristics of the blank material 110 and may include a blank width, a blank thickness, and/or a blank length. The material parameters are indicative of material characteristics of the blank material 110 and may include mechanical properties such as yield stress, tensile stress, a strain, a surface roughness, a friction coefficient (static or dynamic), and/or a strain hardening exponent. The process parameters are indicative of an additive process prior to stamping and/or variables of the stamping machine 108 and may include the amount of lubrication provided on the blank material 110 prior to stamping, friction coefficient of dies (static or dynamic) within the industrial stamping machine 108, and/or surface roughness of the dies.

The parameters may be measured by the preprocess sensors 114 and are calculated based on one or more sensed measurements. For example, preprocess sensors 114 may include, but is not limited to laser measurement sensors, tensometers (universal materials testing machine), digital cameras, lubricant metering devices, and/or measuring gauge, among others. Parameters such as, but not limited to, the friction coefficient and strain is determined based on other parameters. For example, the friction coefficient is determined based on roughness of the material and amount of lubrication applied to the material. In another example, the strain is determined based on yield stress and tensile stress. While specific examples are providing, other parameters may be monitored and employed for developing the stamping process model 104 and determining one or more control parameters for the industrial stamping machine 108 as provided in detail below.

In one form, in addition to the preprocess sensors 114 for measuring the parameters, the stamping system 100 includes one or more process sensors 116 positioned throughout the stamping process 102 to monitor the progression of the blank material 110 to the stamped component 112. For example, the process sensor(s) 116 includes a multi-dimensional digital camera to capture one or more stamping stages. Data from the image sensor(s) is compared with multi-dimensional model(s) representative of the stamped component 112 at a respective stage of the stamping process 102. In one application, the multi-dimensional digital camera is a smart digital camera system having multiple cameras to generate colorized point clouds of the object being scanned and artificial intelligence to analyze the point cloud to identify defects in the object. While specific examples are given, other image sensors may be used, and other sensors may be disposed throughout the stamping process 102 to monitor the transition of the blank material 110 to the stamped component 112. For example, other types of process sensors 116 may include die sensors disposed in and around the dies to monitor operation of the stamping machine 108 during the stamping process such as, but not limited to, proximity sensor, in-die strain gage sensor, and/or die plug force sensor. In the following, data from the process sensors 116 may be referred to as stamped characteristics, and the preprocess sensors 114 and the process sensors 116 may collectively be referred to as sensors 114 and 116, and data.

To analyze data from the sensors 114 and 116, the stamping system 100 includes a process control system that includes a stamping machine controller 120 and the stamping analytics system 106. The process control system is generally referenced by reference number 122. The stamping machine controller 120 is configured to control the industrial stamping machine 108 and the stamping analytics system 106 is configured to analyze data from the sensors 114 and 116 and data provided by a user to define a stamping process model 104. In one form, the stamping machine controller 120 and the stamping analytics system 106 are disposed separately from one another and communicate via one or more communication network(s) 124.

In addition to devices of the process control system 122, external devices such as the sensors 114 and 116 may transmit data to the process control system 122 via the communication networks 124. Furthermore, in one form, at times a user such as an engineer or a technician, may remotely access information of the process control system 122 via the communication network 124. Specifically, in one form, using a computing device 126 such as a laptop or a tablet, the user may access data regarding the stamping process 102 being performed and/or data processed by the stamping analytics system 106 via the communication networks 124 and a web-based interface.

The communication network(s) 124 may include different communication protocols to support communication between devices/controllers of the stamping system 100. For example, message queuing telemetry transport (MQTT) may be used for having the sensors 114 and 116 transmit data to an edge computing device (not shown) within the manufacturing facility and a cellular protocol or other internet protocol is used to have the edge computing device transmit data to the stamping analytics system 106. Accordingly, the communication networks(s) is defined by routers, transceivers, input-output ports, software programs for the communication protocols, among other components to establish a communication link between the stamping machine controller 120 and the stamping analytics system 106.

Figure 2:
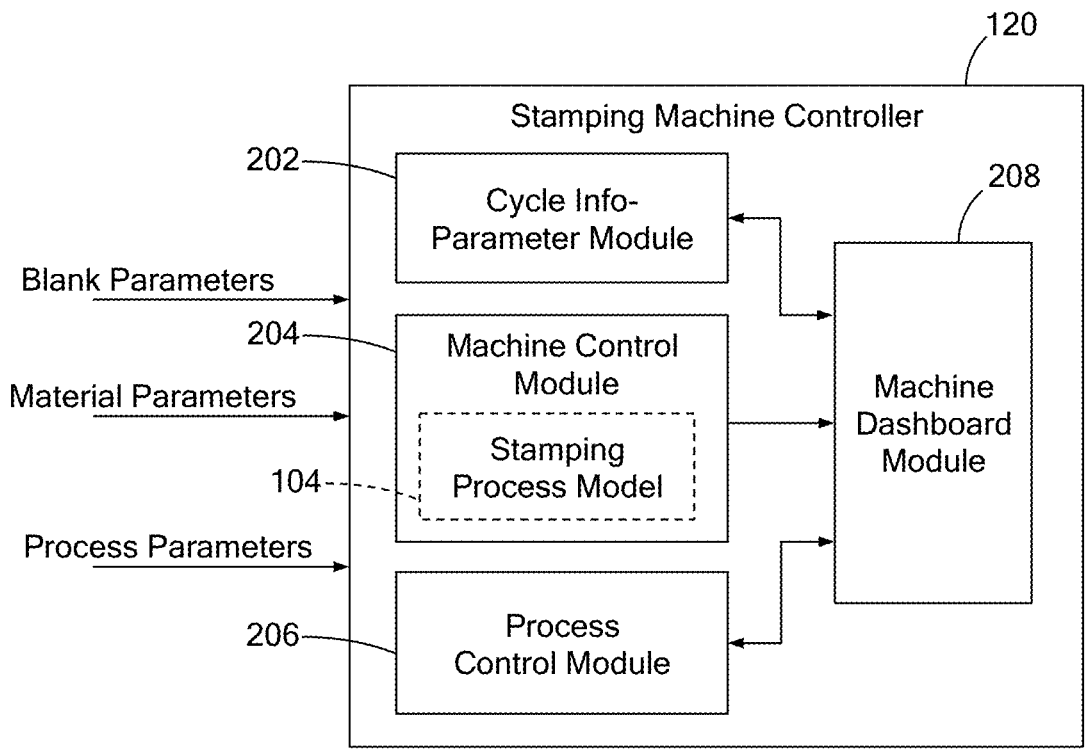
FIG. 2 is a block diagram of a machine controller according to the present disclosure.

Referring to FIG. 2, the stamping machine controller 120 is configured to receive the parameters measured by the preprocess sensors 114 for the blank material 110 to be processed and operate the industrial stamping machine 108 based on the parameters. In one form, the stamping machine controller 120 is configured to include a cycle info-parameter module 202, a machine control module 204, a process control module 206, and a machine dashboard module 208. The cycle info-parameter module 202 receives the parameters from the preprocess sensors 114 and correlates the data with contextual information regarding the blank material 110 and the operation cycle being performed. The contextual information may include a part number of the blank material 110 and/or the stamped component 112 formed from the blank material 110, name of stamping operation to be performed, timestamp, identification information of the industrial stamping machine 108, and/or shift, among others. In one form, the contextual information is acquired from an identification tag (e.g., barcode, QR-code, etc.) provided with the blank material 110 and scanned by a scanner (not shown). In another form, the stamping machine controller 120 is communicably coupled to a facility network that provides contextual information regarding the blank material 110 in real-time.

The machine control module 204 is configured to control the industrial stamping machine 108 to perform one or more stamping operations. In one form, the machine control module 204 is configured to define the control parameter for the industrial stamping machine 108 based on the parameters received and the stamping process model 104. The control parameter may include a cushion tonnage and/or a speed of the dies. Once the control parameter is set the machine control module 204 executes specific control programs for having the industrial stamping machine 108 process the blank material 110 to form the stamped component 112.

While the stamping machine controller 120 is illustrated as having the stamping process model 104, the stamping machine controller 120 may acquire the control parameters from the stamping analytics system 106. For example, the machine control module 204 may transmit the parameters to the stamping analytics system 106 for analysis and receive the control parameter from the stamping analytics system 106. In another example, the preprocess sensors 114 may transmit data to the stamping analytics system 106 by way of, for example, an edge computing device (not shown) disposed in the facility, and the stamping analytics system 106 transmits the control parameter to the stamping machine controller 120 via the edge computing device or directly. In one form, the edge computing device is configured to process the parameters received into a common format prior to transmission to the stamping analytics system 106. The edge computing device is communicably coupled to exchange information with the stamping analytics system via the communication network(s) 124 and may be part of the process control system 122.

The process control module 206 is configured to receive data from the process sensors 116 to monitor the stamping operation being performed on the blank material 110 to determine if the stamped component 112 is within defined tolerances. For example, in one form, the process control module 206 may compare the stamped characteristics from the process sensors 116 to a defined tolerance. If one or more stamped characteristics are out of tolerance, the process control module 206 classifies the stamped component 112 as being defective. Otherwise, if the stamped characteristics are within tolerance, the process control module 206 classifies the stamped component 112 as being complete. The process control module 206 may also be configured to determine if the industrial stamping machine 108 is operating within nominal ranges. If a fault is detected, the process control module 206 may stop operations and issue an alert via a process dashboard The machine dashboard module 208 is configured to display a graphical user interface (GUI) of the stamping process 102 performed by the industrial stamping machine 108. Specifically, the machine dashboard module 208 generates a machine process dashboard that is a digital representation of the stamping process 102 and is an example of a digital stamping process dashboard. In one form, the machine dashboard provides data indicative of one or more of the measured parameters, a multi-dimensional model of the stamped component 112 (i.e., multi-dimensional stamped model), a multi-dimensional model of the blank material 110 (multi-dimensional blank model), the control parameter for the industrial stamping machine 108, accepted tolerances for the stamped component 112, digital images of the stamped component 112, classification of the stamped component 112 (e.g., defective or complete), and/or alerts of possible faults within the stamping process 102. In one form, the machine dashboard module 208 provides information in real-time as the information is acquired. Images illustrated, such as the stamped model and blank model may be acquired from a database (not shown) based on the contextual information received such as name of stamping operation to be performed, identification information of the industrial stamping machine 108, and/or part number of the blank material 110 and/or the stamped component 112. In one form, the process dashboard is illustrated on a touchscreen monitor of the stamping machine controller 120. In addition to or in lieu of the touchscreen monitor, a remote user may view the process dashboard via the computing device.

Figure 3:
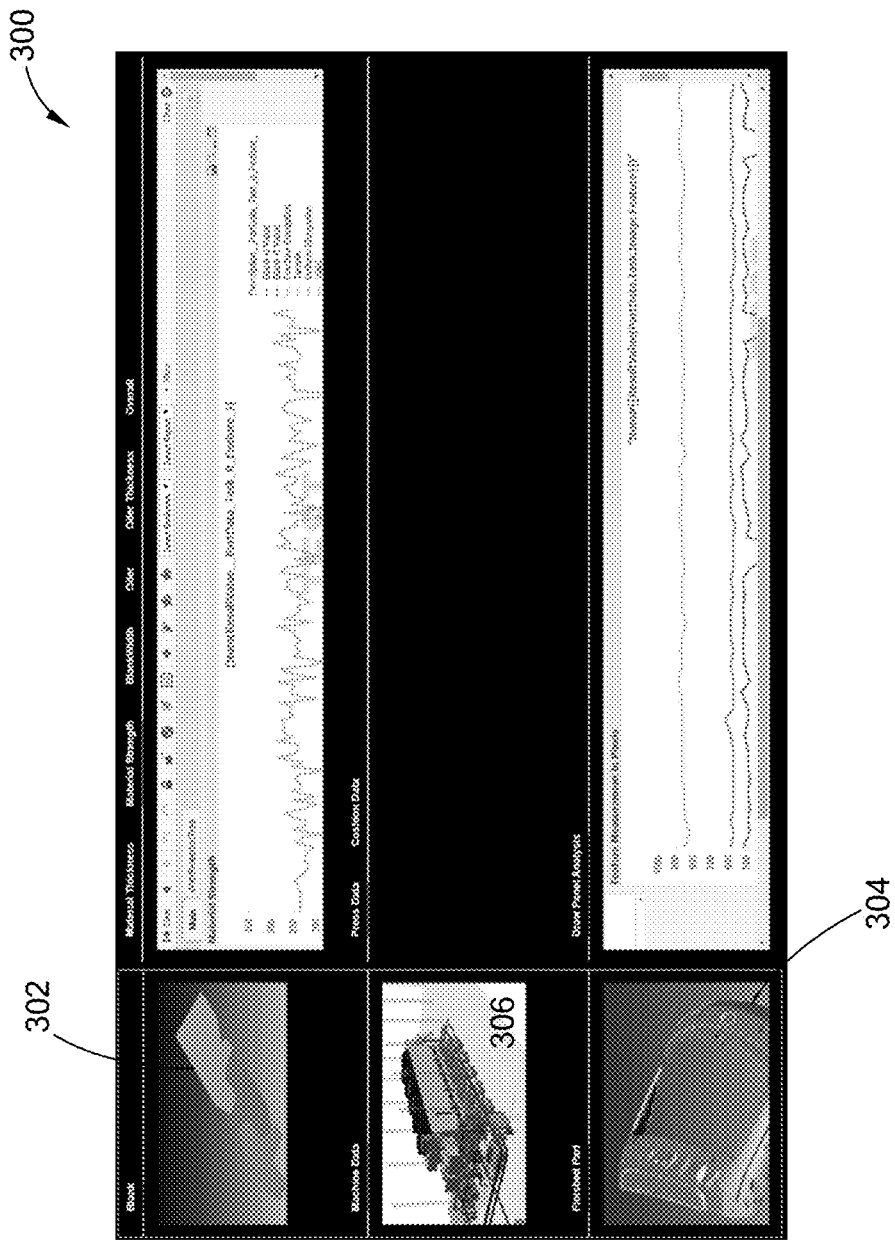
FIG. 3 is an exemplary image of a process dashboard according to the present disclosure.

FIG. 3 illustrates an example process dashboard 300 of the present disclosure. The process dashboard provides a blank model 302, a stamped model 304, and digital representation of an industrial stamping machine identified by reference number 306. The process dashboard further provides various data such as a material parameter portion to depict parameters of the blanks as blanks are being processed and a post process evaluation portion to provide data from process sensors 116 regarding features formed on the stamped component 112. It should be readily understood that the process dashboard may include other features and can be configured in various suitable ways to visually illustrate the information to the user.

Figure 4:
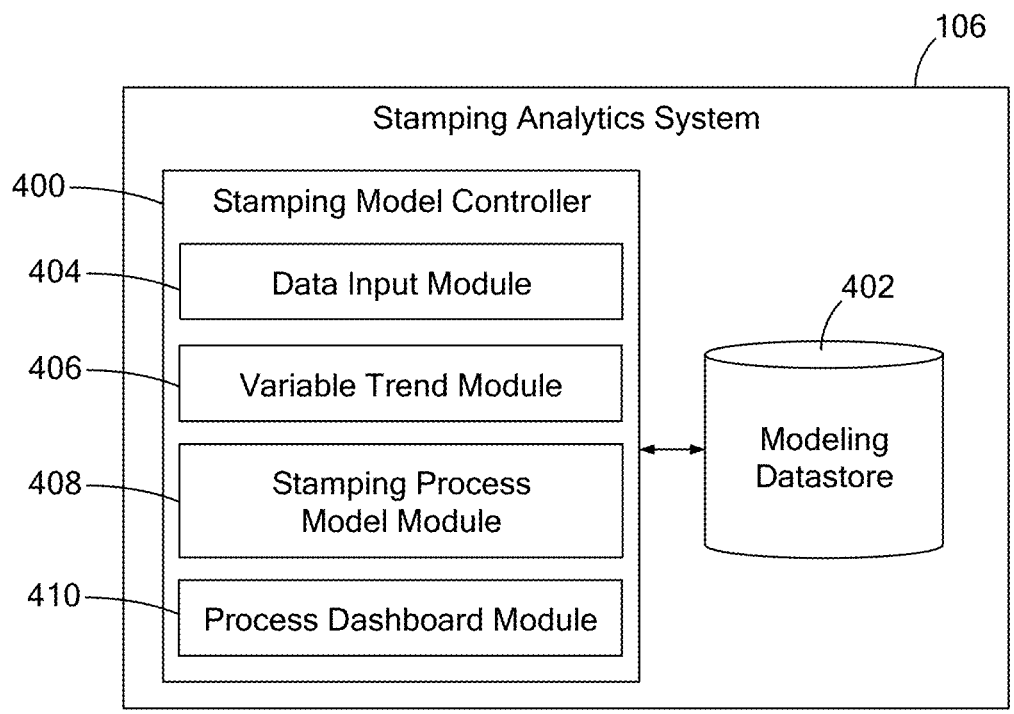
FIG. 4 is a block diagram of a stamping analytics system according to the present disclosure.

Referring to FIG. 4, by employing various machine learning methodologies, the stamping analytics system 106 identifies how different variables of the stamping process 102 influence the blank material 110 as it is being formed into the stamped component 112. In one form, the stamping analytics system 106 includes a stamping model controller 400 and a modeling datastore 402 storing datasets employed for defining the stamping process model 104. In one form, the modeling datastore 402 is configured to store historical parameters, historical control parameters, historical stamping characteristics, among other data.

The stamping model controller 400 is configured to include a data input module 404, a variable trend module 406, a stamping process model module 408, and a process dashboard module 410. The data input module 404 is configured to acquire various datasets such as, but not limited to the parameters detected by the preprocess sensors 114, stamping characteristics from the process sensors 116, contextual information regarding the blank material 110 and the stamping process 102 being performed, the control parameter employed for executing a stamping operation, blank model(s), final component model(s), and/or projected material and structural properties of the stamped component 112 defined by, for example, a finite element analysis. In one form, the data input module 404 is configured to sort and organize the data being received and store the data in the modeling datastore 402. For example, the data input module 404 organizes the dataset based on a timestamp of the data, contextual information, the type of parameter, and/or whether the dataset relates to an identified stamping process variable that influences the formability of the blank material, among others.

The variable trend module 406 is configured to analyze the organized data stored in the modeling datastore 402 to identify a trend between the various variables of the stamping process 102. In one form, the variable trend module 406 is configured to identify correlations and patterns between, for example, the variables and how varying parameter values effect formability of the stamped component 112. Specifically, the variable trend module 406 may alter values of certain parameters and analyze the resulting structural and material properties of the stamped component 112 to determine if and how the altered parameters changed the structural and material properties of the stamped component. The variable trend module 406 is also configured to identify which variables do not influence the formability of the stamped component 112. In the following, the term formability variable references to those stamping process variables that effect the formability of the blank material 110. Various data analytics platforms may be used for identifying the correlation and trends.

The stamping process model module 408 is configured to define the stamping process model 104 that uses one or more of the parameters as an input and generates the control parameter of the industrial stamping machine 108 to have the stamping machine 108 form the stamped component 112. In one form, the stamping process model 104 may further estimate structural and material properties of the stamped component 112 based on the input and the control parameter. In defining the stamping process model 104, the stamping process model module 408 is configured to define a mathematical algorithm (i.e., mathematical association) for each formability variable to characterize how other variables affect the formability variable. In one form, the mathematical algorithms are employed to define the stamping process model 104 that estimates structural and material properties of the stamped component 112 based on formability variables. In one form, the stamping process model 104 employs finite element analysis to estimate the structural and material properties. In one form, using one or more measured parameters, the stamping process model 104 estimates structural and material properties by varying other formability variable such as the control parameter and recommends a nominal control parameter that forms a stamped component 112 within set nominal tolerances.

The stamping process model module 408 is further configured to determine whether the stamped component 112 has a defect and track the measured parameters and control parameter associated with the defected stamp component. This allows the stamping process model module 408 to refine the stamping process model 104 and/or define acceptable tolerance for each formability variable to inhibit defects.

The process dashboard module 410 is configured in a similar manner as machine dashboard module 208 for providing a stamping system dashboard that is a digital representation of the stamping process 102. With access to the modeling datastore, the stamping system 100 dashboard allows the user to review historical data including, but not limited to, measured parameters, control parameter, configuration of dies provided within the industrial stamping machine 108, and/or stamping characteristics of the stamped component 112. The stamping system 100 dashboard is another example of a process dashboard.

The stamping system of the present disclosure employs enhanced process monitoring with advanced data analytics to learn the effect stamping process variables have on the formability of the blank material and thus, the stamped component. Specifically, the stamping system defines a stamping process model that is employed during production to define control parameters for the industrial stamping machine based on true measurements of stamping process variables and not on predefined constants. As data is collected and analyzed, the stamping process model learns the relationship between stamping process variables and between the effect the stamping process variable have with respect to the formability of the blank material. In addition, the stamping process model and historical datasets may be employed in design a stamping process, and more particularly, to improve feasibility simulations and die engineering, and/or reduce integration and launch time to improve quality of stamped components.

Figure 5:
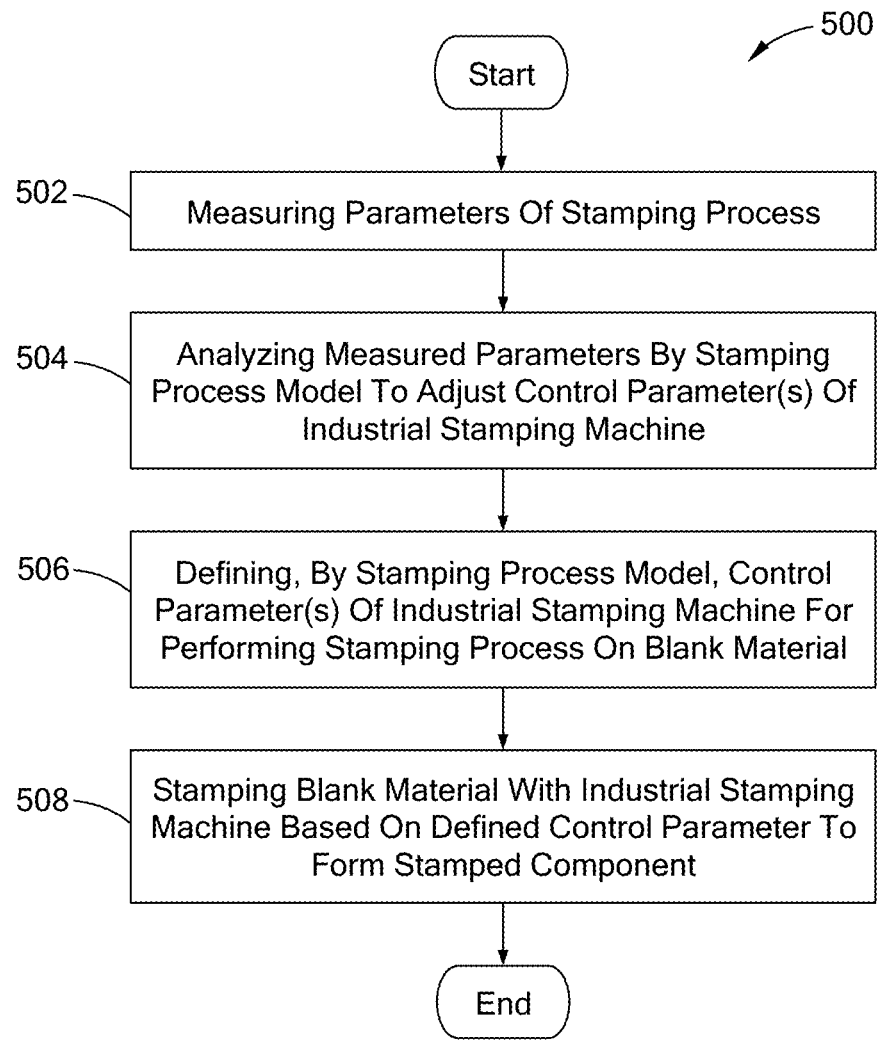
FIG. 5 is a flowchart of a stamping control routine according to the present disclosure.

Referring to FIG. 5, an exemplary stamping control routine 500 performed by the process control system is provided. The stamping control routine is configured to define control parameters for the industry stamping machine to control formability of a blank material to a stamped component. At 502, the process control system is configured to measure parameters of the stamping process. The parameters are identified variables that influence the formability of the blank material. In one form, the parameters include one or more blank parameters, one or more material parameters, and/or one or more process parameters. At 504, the parameters are analyzed by a stamping process model to adjust control parameter(s) of the stamping process, and more particularly, the industrial stamping machine. In one form, the stamping process model is generated by the process control parameters as described above. At 506, the stamping process model defines control parameters of the industrial stamping machine for and at 508, the blank material is stamped with the industrial stamping machine based on the defined control parameters to from the stamped component.

It should be readily understood that the stamping control routine 500 is just one example routine and that the stamping control routine may be configured to various suitable ways and should not be limited to the routine 500. For example, in one form, a stamping control routine may include a defect analysis step determine if the stamped component is defective based on a set tolerance and measured stamping characteristic of the stamped component. The routine may also be configured to store data indicative of the measured parameters, the control parameters for the industrial stamping machine, the stamped characteristic, a quality classification of the stamped component (e.g., defective or complete), and/or contextual information to adjust the mathematical relationships used by the stamping process model.

Various software tools may be employed for the stamping system 100. For example, the stamping system 100 may employ tools such as, but not limited to: Alteryx-type tool to provide self-service analytics to extract data, load data, transfer data, and generate trend charts for visualizations; QlikView-type and/or Tableau-type tool to display trend charts with statistically calculated values; Hadoop-type tool to store data including data from sensors, contextual information, among other data described herein; and/or Hive MQTT-type tool to acquire data from communication links and provide it to, for example, the Hadoop-type tool for storage. It should be readily understood that these are exemplary applications and other application may be employed for the stamping system 100.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for forming a stamped component from a blank material with an industrial stamping machine during a stamping process, the method comprising:
   providing a plurality of parameters of the stamping process, wherein the plurality of parameters is provided as variables of the stamping process;
   identifying, by a stamping process model, any parameters of the plurality of parameters that influence a formability of the stamped component and any parameters of the plurality of parameters that do not influence the formability of the stamped component to adjust the stamping process for the blank material;
   defining a mathematical algorithm for each identified parameter of the plurality of parameters that influence a formability of the stamped component, wherein the mathematical algorithm characterizes how other parameters of the plurality of parameters affect each of the identified parameters of the plurality of parameters that influence the formability of the stamped component;
   generating a stamping process model according to the mathematical algorithm:
   generating, by the stamping process model, a control parameter of the industrial stamping machine for the blank material based on the plurality of parameters that influence the formability of the stamped component; and
   stamping the blank material with the industrial stamping machine based on the control parameter to form the stamped component, wherein:
   the plurality of parameters includes one or more blank parameters, one or more material parameters, and one or more process parameters,
   the one or more blank parameters is indicative of physical characteristics of the blank material,
   the one or more material parameters is indicative of material characteristics of the blank material, and
   the one or more process parameters is indicative of an additive process prior to stamping of the blank material, identified variables of the industrial stamping machine, or a combination thereof.

2. The method of claim 1, wherein:
   the one or more blank parameters includes a blank width, a blank thickness, a blank length, or a combination thereof;
   the one or more material parameters includes mechanical properties that include yield stress, tensile stress, strain, a friction coefficient, a strain hardening exponent, or a combination thereof; and
   the one or more process parameters includes amount of lubrication applied to the blank material, a friction coefficient of dies within the industrial stamping machine, a surface roughness of the dies, or a combination thereof.

3. The method of claim 1 further comprising:
   measuring a post stamping characteristic of the stamped component; and
   analyzing the plurality of parameters and the post stamping characteristic to modify the stamping process model.

4. The method of claim 1 further comprises defining the stamping process model, wherein defining the stamping process model further comprises:
   providing a datastore having a plurality of historical parameters and a plurality of historical control parameters for the plurality of historical parameters;
   defining a mathematical association between the plurality of historical parameters and the historical control parameters; and
   generating the stamping process model based on the defined mathematical association.

5. The method of claim 1 further comprises displaying a digital stamping process dashboard, wherein the digital stamping process dashboard is a digital representation of the stamping process and provides at least one of the plurality of parameters as the plurality of parameters.

6. The method of claim 5, wherein the digital stamping process dashboard further provides a multi-dimensional stamped model of the stamped component, a blank multi-dimensional model of the blank material, the control parameter for the industrial stamping machine, or a combination thereof.

7. The method of claim 1, wherein the control parameter includes a cushion tonnage, die travel, speed, draw cushion, or a combination thereof.

8. The method of claim 1 further comprising:
   measuring a post stamping characteristic of the stamped component;
   classifying the stamped component as being defective when the post stamping characteristic is exceeds a tolerance provided for the post stamping characteristic; and
   classifying the stamped component as being complete when the post stamping characteristic is within the tolerance provided for the post stamping characteristic.

9. The method of claim 1 further comprises displaying a digital stamping process dashboard, wherein the digital stamping process dashboard is a digital representation of the stamping process and displays a multi-dimensional stamped model of the stamped component, a blank multi-dimensional model of the blank material, or a combination thereof.

10. A stamping system for stamping a blank material to provide a stamped component, the stamping system comprising:
    an industrial stamping machine operable to perform a stamping process on a blank material;
    a plurality of sensors disposed to measure one or more parameters selected from among a plurality of parameters prior to the stamping process by the industrial stamping machine, wherein the plurality of parameters is provided as variables of the stamping process; and a process control system configured to:
identify, by a stamping process model, any parameters of the plurality of parameters that influence a formability of the stamped component and any parameters of the plurality of parameters that do not influence the formability of the stamped component to adjust the stamping process for the blank material,
define a mathematical algorithm for each identified parameter of the plurality of parameters that influence a formability of the stamped component, wherein the mathematical algorithm characterizes how other parameters of the plurality of parameters affect each of the identified parameters of the plurality of parameters that influence the formability of the stamped component,
generate a stamping process model according to the mathematical algorithm, and
generate, by the stamping process model, a control parameter of the industrial stamping machine for the blank material based on the plurality of parameters that influence the formability of the stamped component, wherein the industrial stamping machine performs the stamping process based on the control parameter to form the stamped component, and wherein:
the plurality of parameters includes one or more blank parameters, one or more material parameters, and one or more process parameters,
the one or more blank parameters is indicative of physical characteristics of the blank material,
the one or more material parameters is indicative of material characteristics of the blank material, and
the one or more process parameters is indicative of an additive process prior to stamping of the blank material, identified variables of the industrial stamping machine, or a combination thereof.

11. The stamping system of claim 10, wherein:
the one or more blank parameters includes a blank width, a blank thickness, a blank length, or a combination thereof;
the one or more material parameters includes mechanical properties that include yield stress, tensile stress, strain, a friction coefficient, a strain hardening exponent, or a combination thereof; and
the one or more process parameters includes amount of lubrication applied to the blank material, a friction coefficient of dies within the industrial stamping machine, a surface roughness of the dies, or a combination thereof.

12. The stamping system of claim 10, wherein the plurality of sensors includes a multi-dimensional digital camera configured to measure a post stamping characteristic of the stamped component, wherein the process control system is configured to determine whether the stamped component has a defect based on the post stamping characteristic.

13. The stamping system of claim 10 further comprising a datastore storing a plurality of historical parameters and a plurality of historical control parameters for the plurality of historical parameters, wherein the process control system is configured to define a mathematical association between the plurality of historical parameters and the historical control parameters and generate the stamping process model based on the mathematical association.

14. The stamping system of claim 10, wherein the process control system includes a monitor device operable to display a digital stamping process dashboard, wherein the digital stamping process dashboard is a digital representation of the stamping process and provides at least one of the plurality of parameters as the plurality of parameters.

15. The stamping system of claim 14, wherein the digital stamping process dashboard further provides a multi-dimensional stamped model of the stamped component, a multi-dimensional blank model of the blank material, the control parameter for the industrial stamping machine, or a combination thereof.

16. The stamping system of claim 10, wherein the control parameter includes a cushion tonnage, die travel, speed, draw cushion, or a combination thereof.

17. The stamping system of claim 10, wherein the plurality of sensors includes a multi-dimensional digital camera, a dimension measurement device to detect dimensions of the blank material, a material strength measurement device to measures tensile and yield strength of the blank material, a lubrication application measurement device to measure amount of lubrication applied to the blank material, a die sensor, or a combination thereof.

18. The stamping system of claim 10, wherein the process control system includes:
a machine controller configured to control the industrial stamping machine based on the control parameters, and
a stamping analytics system including a stamping model controller and a datastore,
wherein the datastore stores a plurality of historical parameters and a plurality of historical control parameters for the plurality of historical parameters, and
wherein the stamping analytics system is configured to define a mathematical association between the plurality of historical parameters and the historical control parameters and generate the stamping process model based on the mathematical association.

19. The stamping system of claim 18, wherein the machine controller stores the stamping process model to determine the control parameters of the industrial stamping machine.

20. The stamping system of claim 10, wherein the process control system includes a monitor device operable to display a digital stamping process dashboard, wherein the digital stamping process dashboard is a digital representation of the stamping process and displays a multi-dimensional stamped model of the stamped component, a blank multi-dimensional model of the blank material, or a combination thereof.

* * * * *